United States Patent
Suzuki

(10) Patent No.: US 7,214,020 B2
(45) Date of Patent: May 8, 2007

(54) LOOSENESS RESISTING SCREW AND STUD HOLE

(75) Inventor: Yasuo Suzuki, Asaka (JP)

(73) Assignee: Kabushiki Kaisha Suzuki Rashi Seisakusho, Asaka (JP)

( * ) Notice: Subject to any disclaimer, the term of this patent is extended or adjusted under 35 U.S.C. 154(b) by 21 days.

(21) Appl. No.: 11/052,076

(22) Filed: Feb. 8, 2005

(65) Prior Publication Data

US 2005/0265805 A1 Dec. 1, 2005

(30) Foreign Application Priority Data

May 27, 2004 (JP) ............................. 2004-158245

(51) Int. Cl.
*F16B 35/04* (2006.01)
(52) U.S. Cl. .................... 411/417; 411/308; 411/411
(58) Field of Classification Search ................ 411/417, 411/418, 386, 387.4, 308, 310, 411
See application file for complete search history.

(56) References Cited

U.S. PATENT DOCUMENTS

| | | | | |
|---|---|---|---|---|
| 1,088,892 A | * | 3/1914 | Foreman | 411/418 |
| 1,465,148 A | * | 8/1923 | Rosenberg | 411/418 |
| 1,933,332 A | * | 10/1933 | May | 411/418 |
| 3,083,609 A | * | 4/1963 | Lovisek | 411/386 |
| 3,351,115 A | * | 11/1967 | Boehlow | 411/168 |
| 3,794,092 A | * | 2/1974 | Carlson et al. | 411/310 |
| 4,069,730 A | * | 1/1978 | Gutshall | 411/386 |
| 4,161,132 A | * | 7/1979 | Eklund et al. | 411/417 |
| 4,259,889 A | * | 4/1981 | Capuano | 411/417 |
| 4,900,208 A | * | 2/1990 | Kaiser et al. | 411/387.1 |
| 5,876,168 A | * | 3/1999 | Iwata | 411/308 |
| 6,676,352 B2 | * | 1/2004 | Chen-Chi et al. | 411/417 |

FOREIGN PATENT DOCUMENTS

JP  S61-286605  12/1986

* cited by examiner

*Primary Examiner*—Flemming Saether
(74) *Attorney, Agent, or Firm*—Lau & Asso.

(57) ABSTRACT

A looseness resisting screw formed with an external thread includes a first thread area having a substantially uniform outer diameter and a second thread area extended from the first thread area toward a leading end of the screw. The second thread area has a plurality of fractional lead parts each of which has an outer thread diameter increasing along a helical direction of the fractional lead part from a start point to an end point, and the outer thread diameter is substantially equal to a thread root diameter at the start point, while the outer thread diameter is equal to a thread top diameter at the end point. The fractional lead part has a thread sectional area increasing along the helical direction from the start point to the end point, and the thread top diameter of the fractional lead part is slightly larger at the end point than the substantially uniform outer diameter of the first thread area so that the second thread area provides a tapping thread section.

4 Claims, 5 Drawing Sheets

LOOSENESS RESISTING SCREW AND STUD HOLE

BACKGROUND OF THE INVENTION

1. Field of the Invention

The present invention relates to a screw (bolt) and a stud hole with a looseness resisting function, which are applied to various types of electronic instruments such as a cell phone, a digital camera, a liquid-crystal or plasma television, and a personal computer, as well as office equipment including a copy machine and a printer. The screw requires an adequate screwing torque to be screwed with ease and has an appropriate securing force to surely prevent loosening thereof.

2. Background Art

Recently, an extremely thin metal sheet or a low-friction plastic material is used for a chassis or a housing to realize lightweight properties or compact designs in various types of electronic instruments such as a cell phone, a digital camera, a liquid-crystal or plasma television, and a personal computer, as well as office equipment including a copy machine.

Particularly, an instrument having a high-voltage heat source such as a condenser like a liquid-crystal or plasma television, a copy machine, and a printer requires a heat transfer passage. To allow such a heat transfer passage, compact screws and stud nuts (spacers) are to be provided for assembling such an instrument.

In such an industrial field, a looseness resisting screw is needed to secure elements on a thin metal plate of about 0.5 mm or on a low-friction plastic member.

A conventional looseness resisting screw engages at a frank (opposing) angle of about 1° 20' to 3°30' with an associated internal thread, and top and root parts of the screw and the internal thread contact each other.

The conventional looseness resisting screw is screwed into the internal thread so that the thread top part of the screw is pressed against the internal thread. This prevents loosening of the screw. Such a screw is disclosed in Japanese Patent Application Laid-open NO. S-61-286605.

However, the conventional looseness resisting screw and the associated internal thread each have a uniform thread section with a predetermined dimensional allowance. Therefore, a fastening friction force increases with advancement of the screw into the internal thread, since the top part of the screw thread is pressed into the internal thread. This increases a securing torque of the screw, causing a difficult fastening and securing operation of the screw.

Furthermore, the conventional looseness resisting screw and the associated internal thread produce a larger amount of cut-off chips since all the top parts of the screw thread are pressed into the internal thread. This prevents a smooth and quick securing operation of the screw into the internal thread.

Furthermore, the conventional looseness resisting screw and the associated internal thread have a predetermined dimensional difference between thread profiles of the screw and the internal thread. To improve a looseness resisting function of the screw and the internal thread, the dimensional difference needs to be improved.

SUMMARY OF THE INVENTION

In view of the disadvantages of the conventional art, an object of the present invention is to provide a looseness resisting screw and an associated stud hole, achieving an easy fastening and securing operation with smooth and quick steps. The looseness resisting screw and the associated stud hole produce a smaller amount of cut-off chips during a tapping operation of the screw and improve securing and looseness resisting functions after their engagement.

For achieving the object, a basic aspect of the present invention is to provide a looseness resisting screw formed with an external thread including a first thread area having a substantially uniform outer diameter and a second thread area extended from the first thread area toward a leading end of the screw. The second thread area has a plurality of fractional lead parts each of which has an outer thread diameter increasing along a helical direction of the fractional lead part from a start point to an end point, and the outer thread diameter is substantially equal to a thread root diameter at the start point, while the outer thread diameter is equal to a thread top diameter at the end point. The fractional lead part has a thread sectional area increasing along the helical direction from the start point to the end point, and the thread top diameter of the fractional lead part is slightly larger at the end point than the substantially uniform outer diameter of the first thread area so that the second thread area provides a tapping thread section.

Preferably, a shoulder having a surface substantially perpendicular to the central axis of the screw is provided between the two adjacent fractional lead parts.

Preferably, the second thread area has an introductory screw section extended from the tapping section toward a leading end of the screw. The introductory screw section has a thread top diameter smaller than that of the first thread area.

Preferably, the second thread area can tap an internal thread having a thread root diameter substantially the same as the thread top diameter of the first thread area.

Preferably, the first thread area has a thread sectional profile having a first thread flank and a second thread flank positioned rearward from the first thread flank, and the first thread flank has a first angle relative to a base line perpendicular to the central axis of the screw, while the second thread flank has a second angle relative to the base line. Meanwhile, the tapping thread section of the second thread area has a thread sectional profile having a third thread flank and a fourth thread flank positioned rearward from the third thread flank, and the third thread flank has a third angle relative to the base line while the fourth thread flank has a fourth angle relative to the base line. The first angle is equal to the third angle, and the fourth angle is larger than the second angle.

A second aspect of the present invention is to provide a stud hole having an internal thread formed by the insertion of the screw described above.

Thus, the looseness resisting screw and the associated stud hole according to the present invention achieve an easy fastening and securing operation with smooth and quick steps. The looseness resisting screw and the associated stud hole produce a smaller amount of cut-off chips during the tapping operation of the screw and enable improvement in securing and looseness resisting functions after their engagement.

BRIEF DESCRIPTION OF THE DRAWINGS

FIG. 11 is a front view partially showing a section of the stud hole that has fully received the screw.

DETAILED DESCRIPTION OF THE PREFERRED EMBODIMENTS

Figure 1:
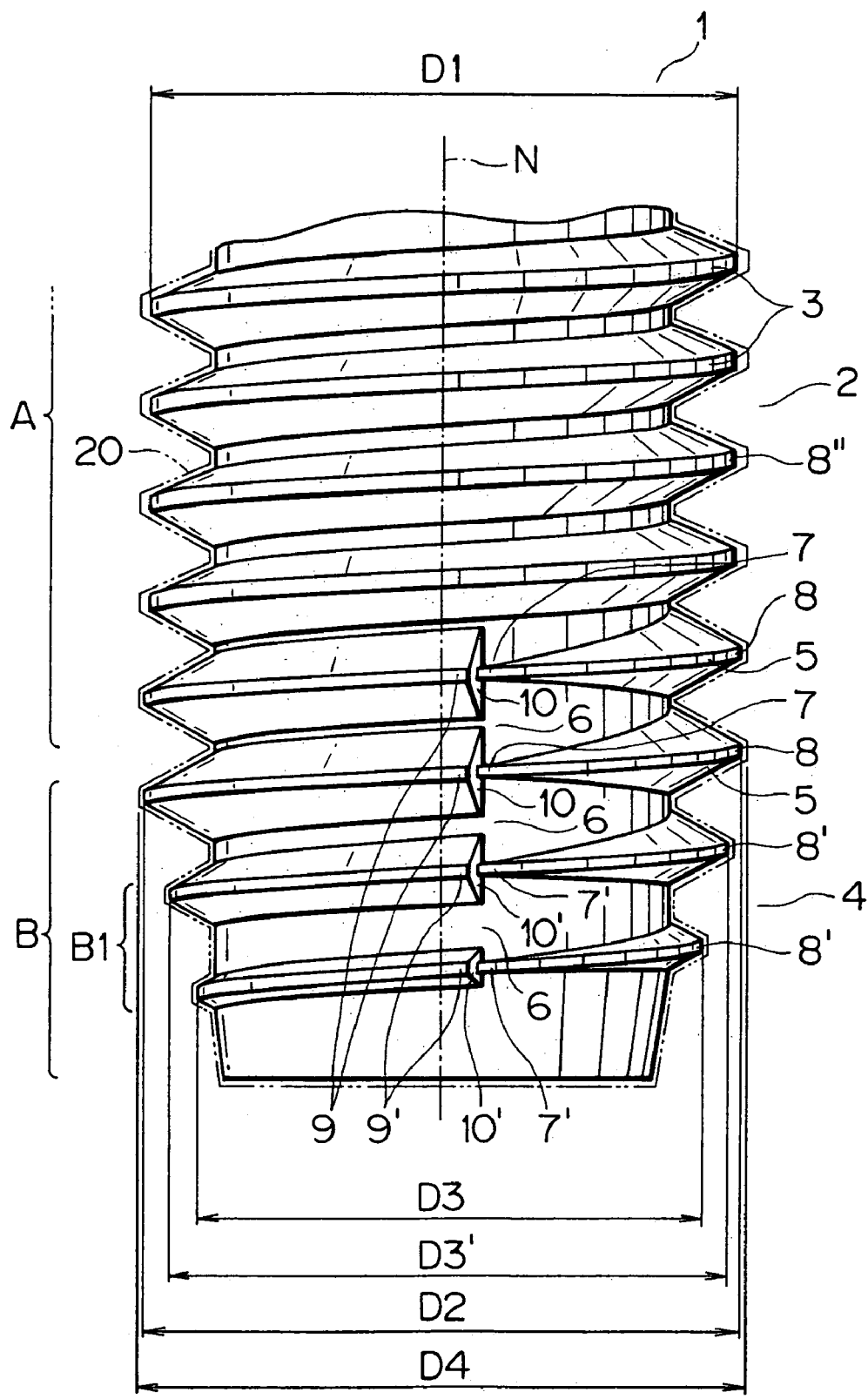
FIG. 1 is an enlarged front view of a looseness resisting screw of a first embodiment according to the present invention.

Referring to the accompanied drawings, embodiments according to the present invention will be discussed in detail.

As shown in FIGS. 1 to 8, a screw or bolt 1 of a first embodiment of the present invention includes: a first thread area A formed with an external thread 3 having a substantially uniform thread top diameter D1 and a second thread area B extending from the first thread area A toward a leading end of the screw 1. The second thread area B has a plurality of fractional lead parts each of which has a diameter increasing along a helical direction of the lead part between a diameter corresponding to a thread root 6 of the lead at a start point 7 and another diameter corresponding to a thread top 8 at an end point 9. Each fractional lead has a sectional area increasing along the helical direction from the start point 7 to the end point 9. The maximum diameter D2 of the lead part is slightly larger than the substantially uniform diameter D1 of the external thread of the first thread area A so that the second thread area B makes up a tapping thread section 5. At the end point 9, the lead part has a shoulder surface 10 oriented toward a center O of the screw at the end point 9.

An introductory thread section B1 is provided in a forward area 4 of the second thread area B. The introductory thread section B1 has diameters D3 and D3' which are smaller than the diameter of the first thread area A. The introductory thread section B1 is helically contiguous with the tapping thread section 5. The introductory thread section B1 also has a plurality, two in the embodiment, of fractional lead parts, each of which has a diameter increasing along a helical direction of the lead part between a diameter corresponding to the thread root 6 of the lead at a start point 7' and another diameter corresponding to a thread top 8' at an end point 9'. Each fractional lead part has a sectional area increasing along the helical direction from the start point 7' to the end point 9'. At the end point 7', the lead part has a shoulder surface 10' oriented toward the center O of the screw.

Figure 5:
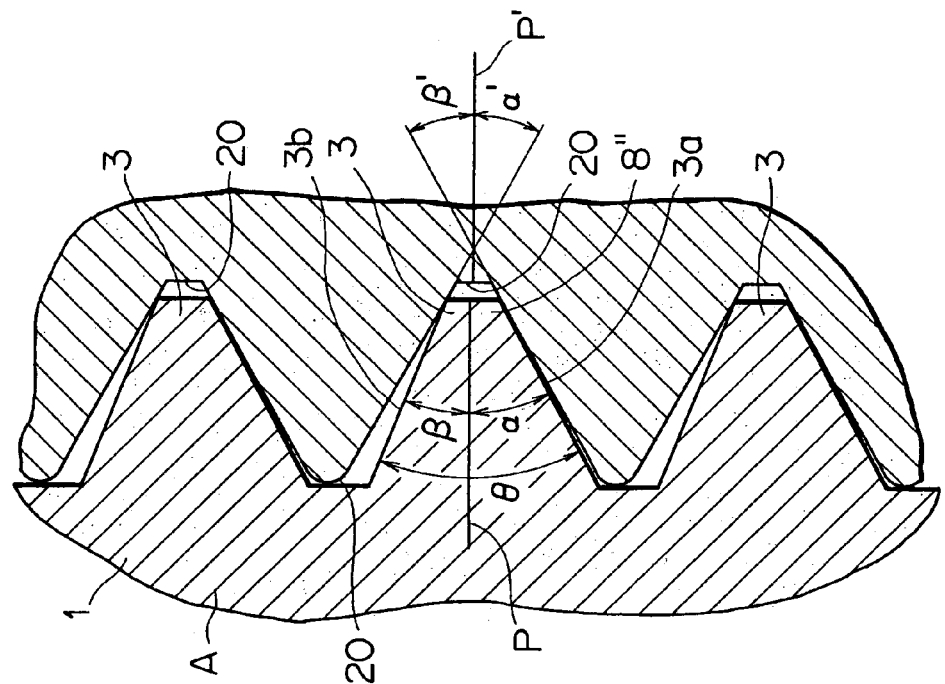
FIG. 5 is an enlarged sectional view showing an engaged state of a first thread area of the screw with an associated internal thread according to the first embodiment.
Figure 3:
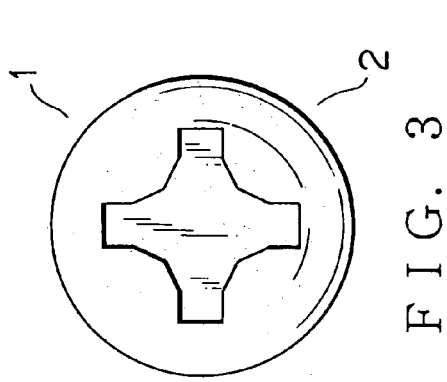
FIG. 3 is a top view of the looseness resisting screw.
Figure 6:
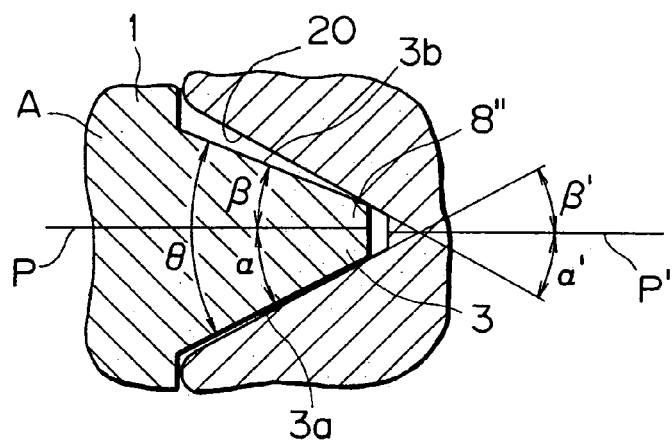
FIG. 6 is another enlarged sectional view showing the engagement.

As shown in FIGS. 5 and 6, the first thread area has an external thread 3 having a first thread flank and a second thread flank positioned rearward from the first thread flank. The first and second thread flanks define an angle θ. The first thread flank has a first angle α relative to a base line P perpendicular to a central axis N of the screw 1, and the second thread flank has a second angle β relative to the base line N. Meanwhile, an internal thread 20 which has been defined by the tapping section 5 has a third thread flank and a fourth thread flank positioned rearward from the third thread flank. The third thread flank has a third angle β' relative to a base line P' perpendicular to the central axis N of the screw, and the fourth thread flank has a fourth angle α' relative to the base line P'. The first angle α is substantially equal to the third angle β', while the second angle β is smaller than fourth angle α'. Thus, a thread top 8" of the external thread 3 of the first thread area A engages with a thread root of the internal thread 20 such that the first thread flank contacts the third thread flank, preventing looseness of the screw 1 relative to the internal thread 20.

The tapping thread section 5 defines a thread root diameter D4 of the internal thread 20. The thread root diameter D4 has an extremely small dimensional difference from the thread top diameter D1 of the external thread 3 of the first thread area A and also from the thread top diameter D2 of the tapping thread section 5. The thread root diameter D4 may be equal to the thread top diameter D1 of the external thread 3 of the first thread area A and also to the thread top diameter D2 of the tapping thread section 5.

Thus configured screw 1 of the first embodiment according to the present invention has the first thread area A and the second thread area B. The second thread area B has the tapping thread section 5 constituted by a plurality of helical thread parts each having the thread top diameter D2 slightly larger than the thread top diameter D1 of the first thread area A. The first thread area A has a plurality of the external thread turns 3 each having the generally uniform thread top diameter D1 to provide a main head thread 2 of the screw 1. The screw 1 is screwed into a straight hole, for example, formed in a metal plate or a low-friction plastic plate. The tapping thread section 5 having the slightly larger diameter D2 defines the internal thread 20 in the straight hole.

Figure 4:
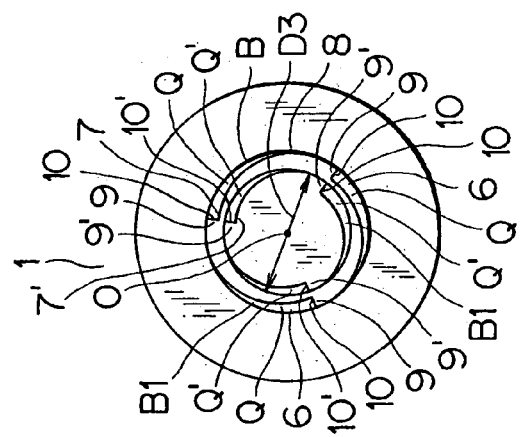
FIG. 4 is a bottom view of the looseness resisting screw.
Figure 2:
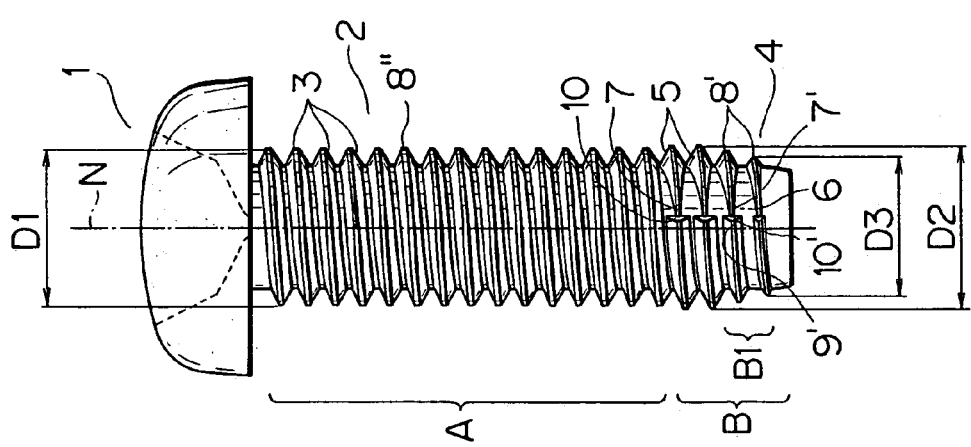
FIG. 2 is a front view fully showing the looseness resisting screw.

As shown in FIG. 4, the second thread area B of the screw 1 has a plurality of fractional lead parts. In FIG. 4, three fractional lead parts form one turn of a thread of the second thread area B. That is, one fractional lead part has a length one-third of a turn of the thread. Each fractional lead part extends from a starting point 7' corresponding to a diameter of the thread root 6 of the screw to the end point 9' corresponding to a diameter of the thread top 8' of the screw. Each fractional lead part has a thread sectional area increasing from the starting point 7' to the end point 9'. The introductory thread section B1 shown in FIGS. 1 and 2 has two turns of the fractional lead parts which are contiguous with the tapping thread section 5. The introductory thread section B1 has diameters D3 and D3' which are smaller than those of the first thread area A. Thus, the tapping thread section 5 can smoothly tap a straight hole with reliability while the thread axis N can maintain its correct straight position.

Then, the external thread 3 of the first thread area A is received in the internal thread 20 formed by the tapping thread section 5. The tapping thread section 5 has the diameter D2 larger than the diameter D1 of the external thread 3 of the first thread area A.

Therefore, the external thread 3 of the first thread area A can engage with the internal thread 20 defined by the tapping thread section 5 with little friction, allowing an adequate screwing torque with a reduced amount of cut-off chips. That is, a smooth and reliable engagement operation of the screw 1 with the internal thread 20 is achieved.

Likewise, the tapping thread section 5 of the screw 1 has a plurality of fractional lead parts. Three fractional lead parts compose one turn of a thread of the second thread area B.

That is, one fractional lead part has a length of one-third turn of the thread. Each fractional lead part extends from the starting point 7 corresponding to a diameter of the thread root 6 to the end point 9 corresponding to a diameter of the thread top 8. Each fractional lead part has a thread sectional area increasing from the starting point 7 to the end point 9. The tapping thread section 5 shown in FIGS. 1 and 2 has two turns of the fractional lead parts which are contiguous with the first thread area A.

At the end point 9 or 9', a shoulder surface 10 or 10' oriented to the center O is formed, and three recesses Q or Q' each are defined between the starting point 7 or 7' and the end point 9 or 9'. Thus, cut-off chips produced during the tapping operation are received in the recesses Q and Q' to be transferred downstream smoothly in the internal thread 20. Accordingly, the screw 1 receives little resistance force from the cut-off chips, achieving a smooth and reliable tapping operation.

In the first embodiment, the tapping thread section 5 defines a thread root diameter D4 of the internal thread 20. The thread root diameter D4 has an extremely small dimensional difference from the thread top diameter D1 of the external thread 3 of the first thread area A and also from the thread top diameter D2 of the tapping thread section 5. The thread root diameter D4 may be equal to the thread top diameter D1 of the external thread 3 of the first thread area A and also to the thread top diameter D2 of the tapping thread section 5. This produces a smaller amount of cut-off chips and surely prevents loosening of the screw 1, which will be more discussed later.

As discussed in FIGS. 5 and 6 of the first embodiment, the thread top 8" of the external thread 3 of the first thread area A contacts the thread root of the internal thread 20. The screw 1 has forward and rear slant faces 3a, 3b, and the forward slant face 3a forcedly abuts against an associated slant face of the internal thread 20. This abutting force provides a resisting friction force against loosening of the screw 1 relative to the internal thread 20. After fastening of the screw 1 into the internal thread 20, the tapping thread section 5 and the first thread area A function to prevent loosening of the screw 1 relative to the internal thread 20.

Figure 7:
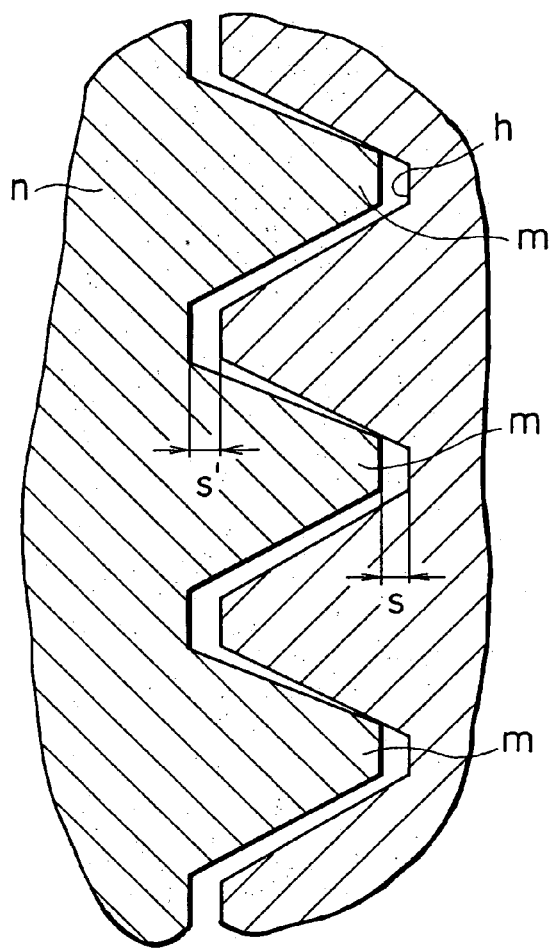
FIG. 7 is an enlarged sectional view of a comparative example for showing an engaged state of an external thread and an internal thread.
Figure 8:
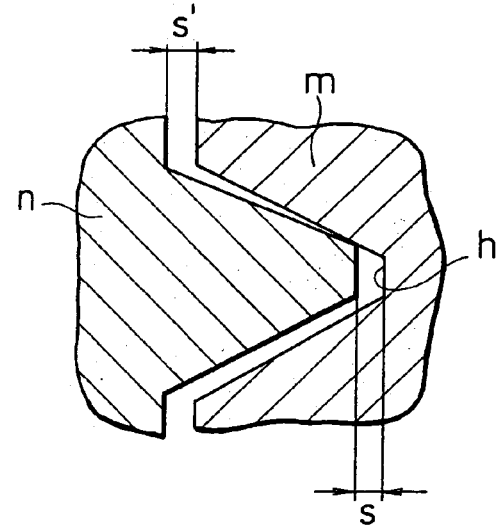
FIG. 8 is an enlarged sectional view similar to FIG. 7.

FIGS. 7 and 8 show a comparative example of an external thread n and an internal thread h. A generally uniform dimensional difference s' is provided between a thread top of the external thread n and a thread root of the internal thread h, while a generally uniform dimensional difference s is provided between a thread root of the external thread n and a thread top m of the internal thread h. This configuration causes loosening of the external thread n in engagement with the internal thread h.

In the first embodiment, an extremely small dimensional difference is applied between the screw 1 and the internal thread 20, enhancing prevention of loosening of the screw 1 engaged with the internal thread 20.

The screw 1 may be removed from the internal thread 20 and may be engaged with the internal thread 20 repeatedly, while the engagement keeps the loosening prevention function. On the contrary, a conventional screw and nut having such a function requires a cutting tool for forming threads with a high precision process to have an extremely small dimensional difference between the screw and the nut.

As s result, the screw 1 is suitably applied as a fastener to a thin metal (for example aluminum) plate or a plastic chassis/body in the electronic instruments and the office machines described already, providing the loosening resisting function.

Figure 9:
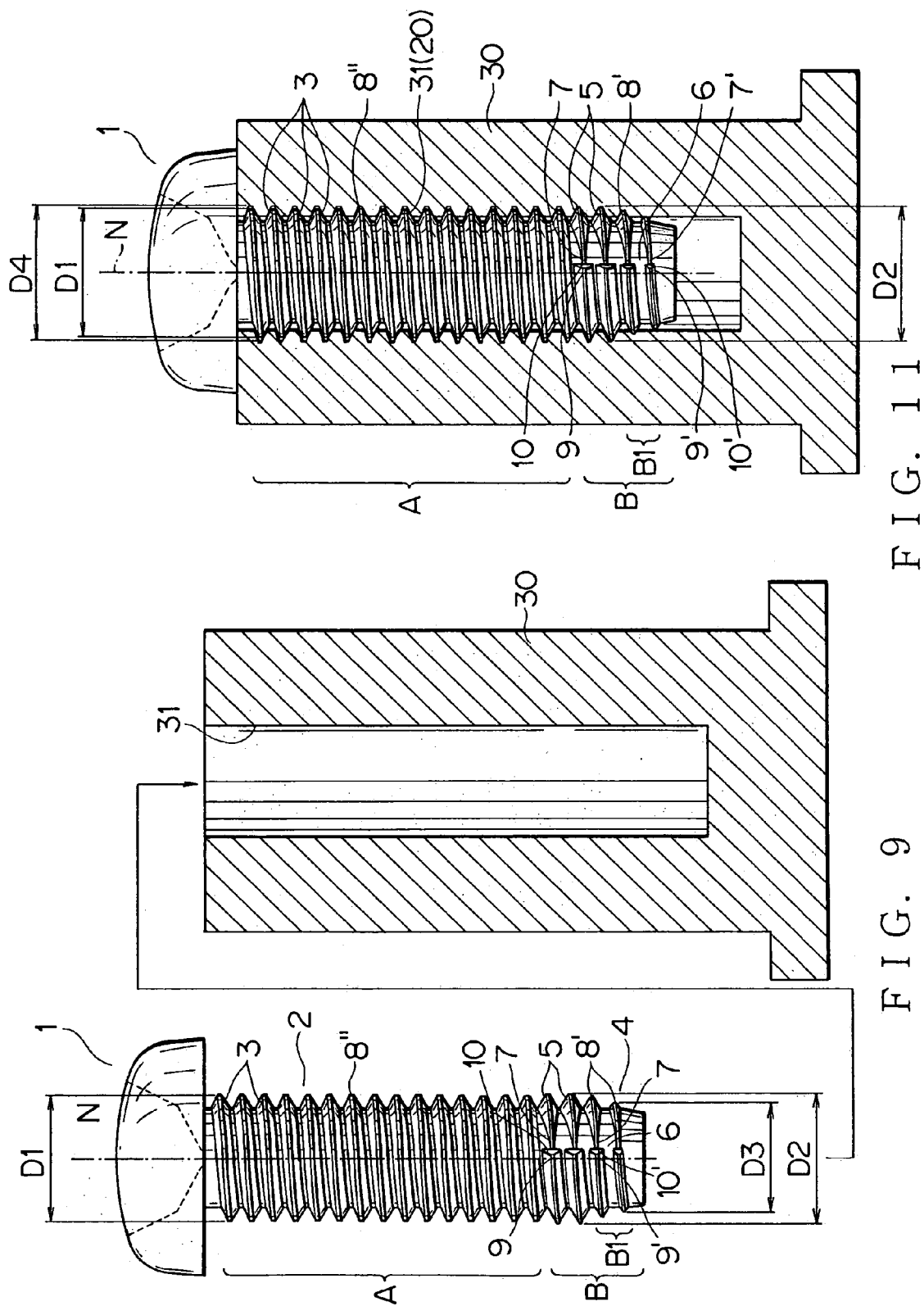
FIG. 9 is a sectional view showing a stud hole according to a second embodiment of the present invention, which includes a front view of the screw.
Figure 10:
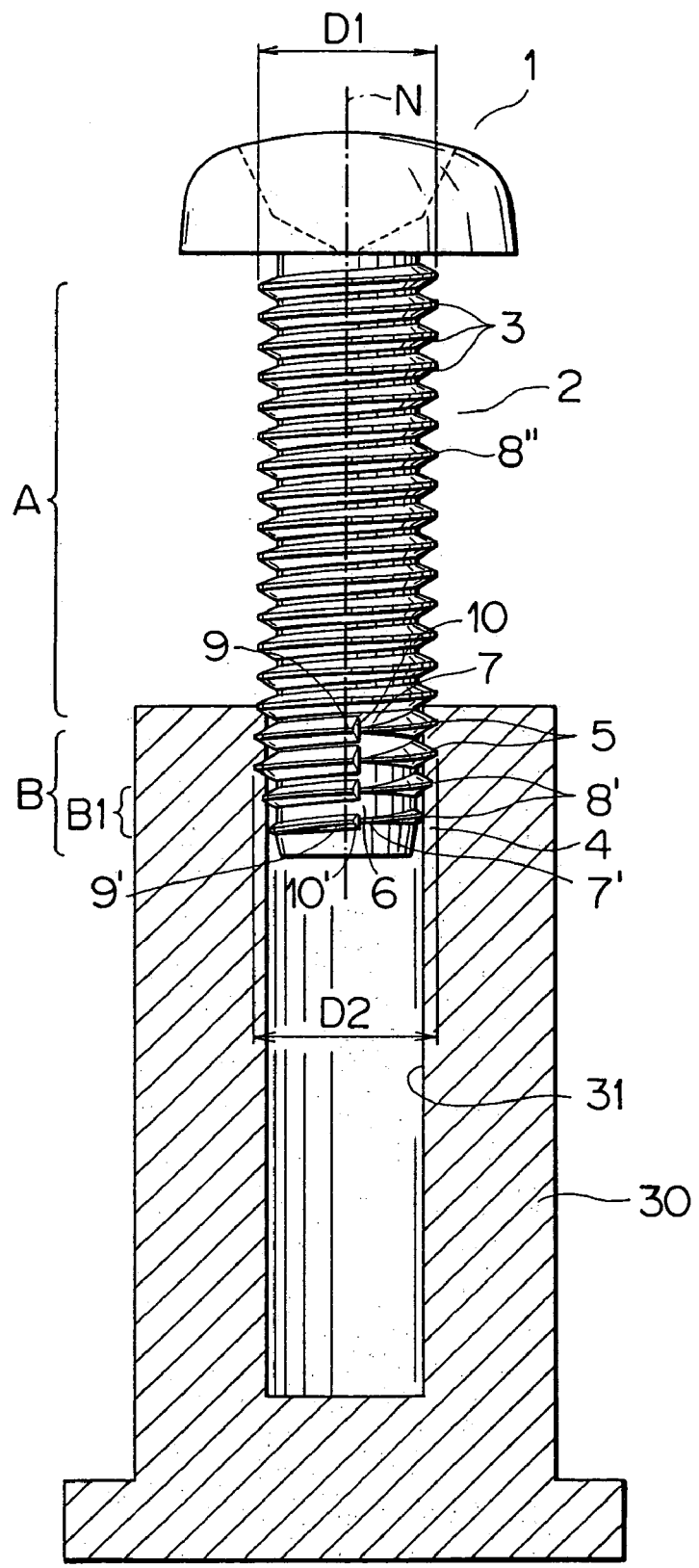
FIG. 10 is a front view partially showing a section of the stud hole that has received the screw at an initial engagement step.

FIGS. 9 to 11 show a second embodiment of the present invention. A screw 1 of the second embodiment has a configuration substantially the same as that of the first embodiment. The second embodiment particularly relates to a securing stud hole 30 having an internal thread 20 defined by screwing the screw 1 into a straight hole 31 of a stud hole body 30.

The stud hole 30 of the second embodiment is applied to screw the screw 1 into a thin metal plate or a plastic chassis/body. The stud hole is most appropriately applied to an instrument such as a liquid-crystal or plasma television, a copy machine, and a printer.

The screw 1 having the tapping thread section 5 taps the straight hole 31 of the stud hole body 30. Thereby, the straight hole 31 is formed with the internal thread 20 in the same way discussed in the first embodiment.

The tapping operation of the screw 1 into the stud hole 30 is carried out with little friction, allowing an adequate screwing torque with a reduced amount of cut-off chips. That is, a smooth and reliable engagement operation of the screw 1 with the internal thread 20 is achieved.

The tapping thread section 5 of the screw 1 having the larger diameter D2 defines an internal thread in the stud hole. Then, thus defined internal thread receive the first thread area A. The thread top 8" of the external thread 3 of the first thread area A contacts the thread root of the internal thread 20. That is, a forward slant face 3a of the screw 1 forcedly abuts against an associated slant face of the internal thread 20. This abutting force provides a resisting friction force against loosening of the screw 1 relative to the internal thread 20. After fastening of the screw 1 into the internal thread 20, the tapping thread section 5 and the first thread area A prevent loosening of the screw 1 relative to the internal thread 20.

The first and second embodiments may be modified in a thread top diameter and a thread root diameter regarding the external thread 3 positioned in the head side 2 of the screw 1, the tapping thread section 5 of the forward thread area 4, and the introductory thread section B1. Furthermore, the screw 1 may be modified in a screw pitch, a tip profile, and a leading angle of the tip. Moreover, the internal thread 20 may be modified in a thread top diameter and a thread root diameter thereof.

The screw 1 may be a right or left hand screw to embody the present invention.

The looseness resisting screw and the associated stud hole according to the present invention achieve an easy fastening and securing operation with smooth and quick steps. The looseness resisting screw and the associated stud hole produce a smaller amount of cut-off chips during the tapping operation of the screw and allow improvement in securing and looseness resisting functions after their engagement.

What is claimed is:

1. A looseness resisting screw formed with an external thread comprising:
   a first thread area having a substantially uniform outer diameter and a second thread area extended from the first thread area toward a leading end of the screw,
   wherein the second thread area has a plurality of fractional lead parts each of which has an outer thread diameter and an axial thickness at the root of the thread increasing along a helical direction of the fractional lead part from a start point to an end point, and said outer thread diameter is substantially equal to a thread root diameter at the start point, while said outer thread diameter is equal to a thread top diameter at the end point, the shoulder having a surface substantially perpendicular to a central axis of the screw is provided between the two of the fractional lead parts wherein the starting point is at the shoulder;

wherein the fractional lead part has a thread sectional area increasing along the helical direction from the start point to the end point, and the thread top diameter of the fractional lead part is slightly larger at the end point than the substantially uniform outer diameter of the first thread area so that the second thread area provides a tapping thread section, and wherein the second thread area has an introductory screw section extended from the tapping section toward the leading end of the screw.

2. The screw recited in claim 1 wherein the introductory screw section has a thread outer diameter smaller than that of the first thread area.

3. The screw recited in claim 1 wherein the second thread area can tap an internal thread having a thread root diameter substantially the same as the uniform outer diameter of the first thread area of the screw.

4. The screw recited in claim 1 wherein the first thread area has a thread sectional profile having a first thread flank and a second thread flank positioned rearward from the first thread flank, and the first thread flank has a first angle relative to a base line perpendicular to a central axis of the screw, while the second thread flank has a second angle relative to the base line, wherein the tapping thread section of the second thread area has a thread sectional profile having a third thread flank and a fourth thread flank positioned rearward from the third thread flank, and the third thread flank has a third angle relative to the base line while the fourth thread flank has a fourth angle relative to the base line, wherein the first angle is equal to the third angle, and the fourth angle is larger than the second angle.

* * * * *